United States Patent

[11] 3,598,896

[72] Inventors Heinrich Hassler
Wendelstein;
Horst Schreiner, Nurnberg, both of, Germany
[21] Appl. No. 859,795
[22] Filed Sept. 22, 1969
[45] Patented Aug. 10, 1971
[73] Assignee Siemens Aktiengesellschaft
Berlin and Munich, Germany
[32] Priority Sept. 20, 1968
[33] Germany
[31] P 17 89 005.0

[54] ENCAPSULATED SEMICONDUCTOR DEVICE WITH PARTS FORMED OF SINTER METAL AND PLASTIC
8 Claims, 5 Drawing Figs.

[52] U.S. Cl. .......... 174/52 PE, 29/588, 174/52 S, 264/134, 264/272, 317/234 E
[51] Int. Cl. .......... B29c 6/02, H01l 9/04
[50] Field of Search .......... 317/234, 235; 174/52.5, 52.6; 29/588, 589; 264/134, 272

[56] References Cited

UNITED STATES PATENTS 3,475,662 10/1969 Zido .......... 317/234

*Primary Examiner*—John W. Huckert
*Assistant Examiner*—E. Wojciechowicz
*Attorneys*—Curt M. Avery, Arthur E. Wilfond, Herbert L. Lerner and Daniel J. Tick

ABSTRACT: In an encapsulated semiconductor device having a semiconductor body and means for contacting and encapsulating the body, these means comprise a structure of porous sinter metal and of synthetic plastic forming an impregnation in the pores of the sinter metal. An insulating structure of filler-containing plastic is pressure molded onto the sinter metal structure and merges with the impregnation in the pores. Preferably the structure made of filler-containing plastic forms part of the encapsulation.

PATENTED AUG 10 1971 3,598,896

ENCAPSULATED SEMICONDUCTOR DEVICE WITH PARTS FORMED OF SINTER METAL AND PLASTIC

Our invention relates to encapsulated semiconductor devices and has for its general object to considerably prolong the useful life of such devices.

This calls for a gastight and moisturetight sealing of the capsule and electrical lead-in conductors, and such a tight seal depends upon the quality of the adhesion or bonding between the insulation which encloses the capsule or housing and the current-conducting semiconductor contacts that extend from within to the outside of the device, such contacts being in some cases designed as components of the housing structure. The insulation surrounding or covering the housing is often made of synthetic plastic. By employing porous bodies of sintered metal for the current or heat conducting metal parts adjacent to the synthetic plastic, so that the plastic material can penetrate into the pores of the sintered structure, a relatively good seal between the plastic and metallic parts is attainable on account of the intermeshing of these materials. For technological and manufacturing reasons, however, the synthetic-plastic insulation in most cases is produced from press masses which contain a high proportion of additional filler substances so that the penetrating depth of the heterogeneous plastic into the sinter metals is rather slight. As a result, the adhesive strength between sinter body and synthetic material is not resistant to aging.

It is therefore a more specific object of our invention to improve encapsulated semiconductor devices of the type equipped with means for contacting the encapsulated semiconductor body of the device, so as to secure a gasproof and moistureproof seal of better quality and higher resistance to aging than heretofore attained.

According to our invention the means for contacting and encapsulating the semiconductor body of the device comprise a structure of porous sintered metal and of synthetic plastic which forms an impregnation in the pores of the sinter metal, and the same contacting and encapsulating means further comprise an insulating structure of filler-containing plastic which is pressure molded onto the sinter metal structure and fuses or merges together with the plastic impregnation contained in the pores of the sintered structure. The filler-containing plastic may either envelop the entire, otherwise exposed surface of the sintered and impregnated structure, or it may cover only the area of the sinter structure that requires sealing.

According to another feature of the invention the preferably pure synthetic plastic used for impregnation of the sinter metal, and the plastic to be pressed onto or about the sinter metal structure, have the same chemical composition, with the exception, of course, of the filler addition contained in the pressure-molded plastic. The latter plastic may also form a portion of the housing for the semiconductor device.

Preferably employed as a plastic material is a low-pressure mass on epoxy resin base. For press molding this plastic onto or around the housing, the plastic is mixed with such filler substances as mineral meals and/or metal oxides. Preferably used as filler is quartz meal.

The invention will be further described with reference to embodiments of devices according to the invention illustrated by way of example on the accompanying drawing, in which.

Figure 1:
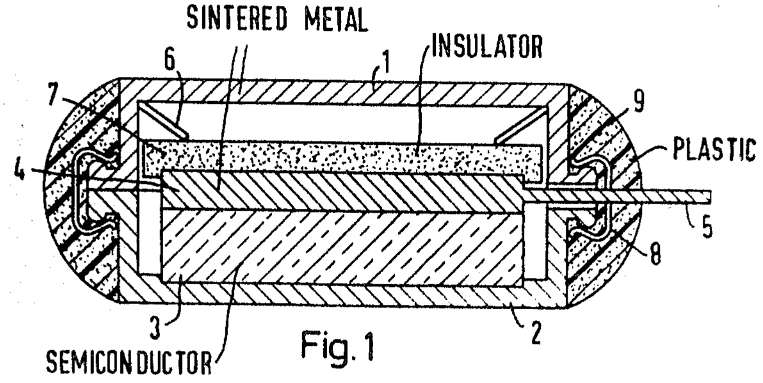
FIG. 1 is a sectional view of an encapsulated semiconductor device.

The device according to FIG. 1 comprises two preimpregnated sinter structures 1 and 2 of copper or silver designed as rotationally symmetrical half-shells which form parts of the housing. Mounted within the housing is a crystalline semiconductor body 3, for example, of silicon or germanium. The semiconductor body may be prepared as a single crystal and contain at least one PN junction as needed for a rectifier or other diode, transistor or thyristor. The semiconductor body 3 is in electrical face-to-face contact with the bottom portion 2 of the housing and on the opposite side with a likewise sintered contact plate 4, for example of copper. The terminal lug 5 of the contact plate 4 passes to the outside through an insulating recess in the housing. The necessary contact pressure is supplied by an annular spring 6 which is braced against the housing portion 1 and presses through an electrically insulated disc 7 upon the semiconductor and contact assembly. The two housing portions 1 and 2 are held together by U-shaped clamps 8 of which the one located at the contact lug 5 is subdivided (FIG. 2) to preserve the electrical insulation of the lug.

The assembly so far described is sealed by pressure-molded jackets or covers 9 of plastic material. As explained, the jacket material is homogeneously joined with the plastic impregnation contained in the pores of the housing portions 1 and 2, the merging of the impregnation with the external plastic resulting from the fact that the impregnation becomes fluid and fuses together with the pressure plastic as the latter is being pressed onto or about the other components of the device. The jacket may have sufficient thickness to fully envelop the housing portions 1 and 2 in the completed state of the device or it may be virtually absent at localities that are sufficiently sealed by the impregnation. Thus in FIG. 1 the external jacketing is shown only at the ends of the device where the housing is subdivided and traversed by an insulated lead.

Figure 2:
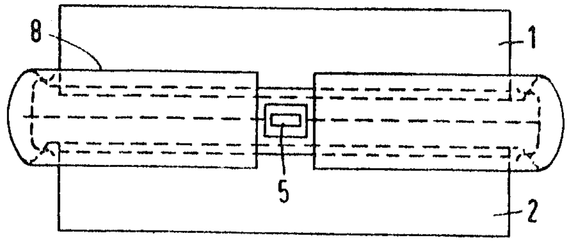
FIG. 2 is a lateral view of the same device.

FIG. 2 shows the same device in lateral elevation, but without the plastic jacket 9 and without the components 3, 4, 6 and 7 located in the interior.

Figure 3:
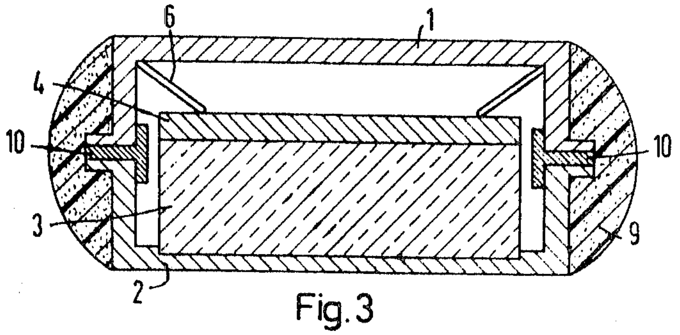
FIG. 3 is section through another embodiment.

As shown in FIG. 3, the housing half-portions 1 and 2 may also be electrically insulated through a ceramic intermediate ring 10 so that the upper portion 1 of the housing is available as an additional electrode or contact. This makes it unnecessary to have a lug or other conductor pass from the semiconductor body 3 through the housing to the outside, since the two necessary contacts of the illustrated diode or other two-pole device are constituted by the metallic housing portions 1 and 2 respectively. For providing separation with respect to the electrical potentials between housings portions 1 and 2, in embodiments of the type represented by FIG. 3 it is preferable to omit the clamp 8. The plastic jacket 9 then serves to provide the rigid connection needed between the two housing portions for maintaining the pressure force of the spring 6.

Figure 4:
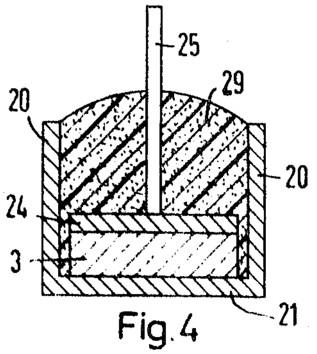
FIGS. 4 and 5 illustrate two further modifications respectively.

In the device shown in FIG. 4, the semiconductor body 3 is soldered into a cup-shaped housing portion 20 of preimpregnated sinter metal.

Figure 5:
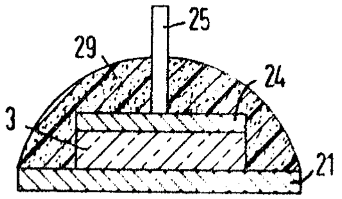

According to FIG. 5 the lateral wall of the housing 20 may be omitted, retaining only the bottom plate 21 consisting of a preimpregnated plate of sinter metal.

In embodiments according to FIGS. 4 and 5, a contact plate 24 of preimpregnated sinter metal may be placed upon the semiconductor body 3 as illustrated, and may be provided with a terminal lug 25. These devices are readily produced by first soldering the semiconductor body 3 onto the bottom plate 21 and thereafter pressing the filler-containing plastic onto and around the semiconductor body and contact plate 24 placed on top of the body.

It will be understood from the foregoing description of the illustrated embodiments that the method of producing semiconductor devices according to the invention is preferably carried out by first impregnating the sinter metal parts with plastic and to thereafter mold by pressure the filler-containing plastic onto the sinter metal parts at least in those areas that are to be hermetically sealed. In this manner, the preimpregnated sinter metal bodies are made completely tight at any gaps and openings needed for interconnecting individual sinter metal bodies or for extending conductors from the inside to the outside of the encapsulation.

When employing porous sinter metal bodies as current or heat conducting parts, particularly as housings or housing components of an encapsulated semiconductor device, these sintered parts are preferably first impregnated with a substantially pure mass of synthetic plastic. After impregnation, for example in vacuum, the plastic mass solidifies in the pores of the sintered body, converting from the liquid A-state to the solid but meltable B-state. Thereafter the filler-containing synthetic plastic is pressed onto or about the sinter body. During pressure molding, the operating temperature applied to the filler-containing mass causes the B-state plastic in the pores of the sinter body to melt and to fuse together with the plastic pressed onto the pores. After completion of the molding operation, the external, filler-containing plastic forms a single integral and homogeneous junction with the plastic impregnation. Upon elapse of a sufficiently long hardening period, the entire plastic structure of the bonded system thus produced converts to the duroplastic C-state.

By virtue of the invention the mechanical state of the metal-plastic bond thus produced is about three to four times higher than the strength of a sinter structure which is enveloped by filler-containing plastic in the same manner but whose sinter bodies are not previously impregnated.

Furthermore, the shaped structures made of porous sinter metal according to the invention may have locally different space-filling factors and different pore size distributions. Hence the local electrical and thermal conductivity is adaptable to any particular requirements.

In tests made with devices according to the invention the gas tightness of the above-mentioned bonded system was measured, using a bonded disc structure of 3.5 mm. thickness. The amount measured for helium was below $10^{110}$ torr · liter per second.

The porous sinter bodies are preferably made of silver, copper, iron, molybdenum, tungsten as well as bonded metals made from those just mentioned. The space filling factor of the sinter metal parts to be impregnated is preferably about 0.6 to 0.8 corresponding to an occupation of 60 to 80 percent of the space by the metal, the remaining space being occupied by voids pores.

To those skilled in the art it will be obvious upon a study of this disclosure that, with respect to the particular design, size and materials, our invention permits of a great variety of modifications and hence may be given embodiments other than those particularly illustrated and described herein, without departing from the essential features of the invention.

We claim:

1. In an encapsulated semiconductor device having a semiconductor body and means for contacting an encapsulating said body, the improvement according to which said means comprise a structure of porous sinter metal , and synthetic plastic forming an impregnation in the pores of said sinter metal, and an insulating structure of filler-containing plastic pressure molded onto at least a portion of said sinter metal structure and merging with said plastic impregnation.

2. In a semiconductor device according to claim 1, said impregnation and said plastic of said insulating structure having substantially the same chemical composition.

3. In a semiconductor device according to claim 1, said plastic of said impregnation having a higher purity than said plastic of said insulating structure.

4. In a semiconductor device according to claim 1, said structure of filler-containing plastic forming part of said encapsulation.

5. In a semiconductor device according to claim 1, said plastics being low-pressure epoxy base resin.

6. In a semiconductor device according to claim 5, said filler in said plastic insulating structure consisting substantially of at least one mineral-meal or metal-oxide substance.

7. In a semiconductor device according to claim 5, said filler in said plastic insulating structure consisting substantially of quartz meal.

8. The method of producing an encapsulated semiconductor device having a semiconductor body and means for contacting and encapsulating said body, which means comprise a structure of porous sinter metal, said method comprising the steps of impregnating the sinter-metal structure at least partially with synthetic plastic, and —after solidification of the plastic —pressure molding a filler-containing plastic onto the impregnated structure so as to have the latter plastic merge with the plastic impregnation in the pores.